US008639258B2

(12) United States Patent
Chen et al.

(10) Patent No.: US 8,639,258 B2
(45) Date of Patent: Jan. 28, 2014

(54) MEASUREMENT SCHEDULING IN CELL_FACH (FORWARD ACCESS CHANNEL) AND CELL_DCH (DEDICATED CHANNEL) STATES

(75) Inventors: Qingxin Chen, Del Mar, CA (US); Aamod Dinkar Khandekar, San Diego, CA (US); Srikanth Gummadi, Secundarabad (IN); Shan Qing, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 251 days.

(21) Appl. No.: 13/157,188

(22) Filed: Jun. 9, 2011

(65) Prior Publication Data

US 2012/0314589 A1 Dec. 13, 2012

(51) Int. Cl.
*H04W 72/00* (2009.01)
(52) U.S. Cl.
USPC ........................................................ 455/450
(58) Field of Classification Search
USPC ........................................................ 370/310
See application file for complete search history.

(56) References Cited

U.S. PATENT DOCUMENTS

2008/0002604 A1* 1/2008 Wilborn et al. ............... 370/320

FOREIGN PATENT DOCUMENTS

EP 2306771 A1 4/2011
WO 03098952 A1 11/2003

OTHER PUBLICATIONS

International Search Report and Written Opinion—PCT/US2012/041775—ISA/EPO—Sep. 20, 2012.
Renesas Mobile Europe LTD et al., "Inter-RAT UMTS to LTE Reselection", 3GPP Draft; R4-112967, 3rd Generation Partnership Project (3GPP), Mobile Competence Centre ; 650, Route Des Lucioles ; F-06921 Sophia-Antipolis Cedex ; France, vol. RAN WG4, no. Barcelona, Spain; 20110509, May 3, 2011, XP050502434, [retrieved on May 3, 2011].

* cited by examiner

*Primary Examiner* — Mark Rinehart
*Assistant Examiner* — Maharishi Khirodhar
(74) *Attorney, Agent, or Firm* — Kristine U. Ekwueme

(57) ABSTRACT

Methods and apparatus are provided for operating in a first RAN at a working frequency, determining a priority of measurement tasks enabled by the first RAN, and dynamically scheduling the tasks according to the priority. For certain aspects, the first RAN may be a TD-SCDMA network. The measurement tasks are intended to measure at least one parameter of a serving cell in the first RAN on a primary frequency, at least one cell in the first RAN on at least one frequency other than the primary frequency, one or more cells in at least one RAN other than the first RAN (e.g., a GSM network) or any combination thereof. This dynamic assignment allows the UE to make scheduling decisions on which frequencies and RANs to measure, as well as how often these frequencies and RANs are measured, thereby providing for more efficient use of idle slots over conventional haphazard scheduling.

68 Claims, 10 Drawing Sheets

MEASUREMENT SCHEDULING IN CELL_FACH (FORWARD ACCESS CHANNEL) AND CELL_DCH (DEDICATED CHANNEL) STATES

BACKGROUND

1. Field

Certain aspects of the present disclosure generally relate to wireless communications and, more particularly, to scheduling TD-SCDMA measurement tasks based on a priority of the measurement tasks.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (W-CDMA), Time Division-Code Division Multiple Access (TD-CDMA), and Time Division-Synchronous Code Division Multiple Access (TD-SCDMA). For example, in certain locations, TD-SCDMA is being pursued as the underlying air interface in the UTRAN architecture with its existing GSM infrastructure as the core network. The UMTS also supports enhanced 3G data communications protocols, such as High Speed Downlink Packet Data (HSDPA), which provides higher data transfer speeds and capacity to associated UMTS networks.

As the demand for mobile broadband access continues to increase, research and development continue to advance the UMTS technologies, not only to meet the growing demand for mobile broadband access, but to advance and enhance the user experience with mobile communications.

SUMMARY

Certain aspects of the present disclosure generally relate to operating in a first RAN at a working frequency, determining a priority of measurement tasks enabled by the first RAN, and dynamically scheduling the measurement tasks according to the priority. For certain aspects, the first RAN may be a Time Division-Synchronous Code Division Multiple Access (TD-SCDMA) network. The measurement tasks are intended to measure at least one parameter of a serving cell in the first RAN on a primary frequency, at least one cell in the first RAN on at least one frequency other than the primary frequency, one or more cells in at least one RAN other than the first RAN (e.g., a GSM network or a UTRAN), or any combination thereof.

In an aspect of the disclosure, a method for wireless communications is provided. The method generally includes receiving a frame (e.g., from a serving cell in a first RAN), determining one or more idle periods in the frame, and scheduling one or more measurement tasks to be performed during at least one of the idle periods, wherein the scheduling is based on a priority of the measurement tasks.

In an aspect of the disclosure, an apparatus for wireless communications is provided. The apparatus generally includes means for receiving a frame, means for determining one or more idle periods in the frame, and means for scheduling one or more measurement tasks to be performed during at least one of the idle periods, wherein the scheduling is based on a priority of the measurement tasks.

In an aspect of the disclosure, an apparatus for wireless communications is provided. The apparatus generally includes a receiver configured to receive a frame, at least one processor, and a memory coupled to the at least one processor. The at least one processor is typically configured to determine one or more idle periods in the frame and to schedule one or more measurement tasks to be performed during at least one of the idle periods, wherein the scheduling is based on a priority of the measurement tasks.

In an aspect of the disclosure, a computer-program product for wireless communications is provided. The computer-program product generally includes a computer-readable medium having code for receiving a frame, determining one or more idle periods in the frame, and scheduling one or more measurement tasks to be performed during at least one of the idle periods, wherein the scheduling is based on a priority of the measurement tasks.

BRIEF DESCRIPTION OF THE DRAWINGS

Aspects and embodiments of the disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

An Example Telecommunications System

Figure 1:
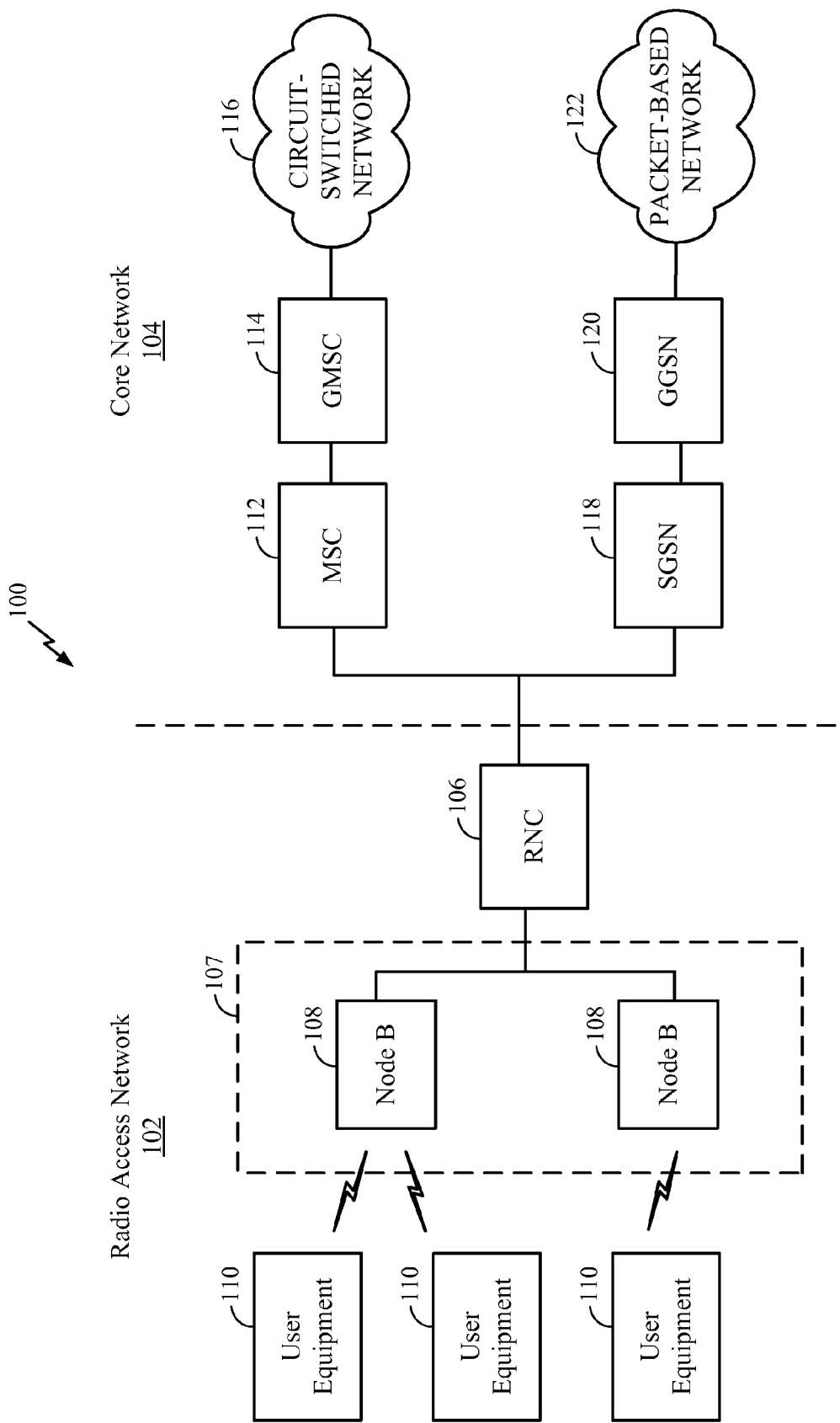
FIG. 1 is a block diagram conceptually illustrating an example of a telecommunications system in accordance with certain aspects of the present disclosure.

Turning now to FIG. 1, a block diagram is shown illustrating an example of a telecommunications system 100. The various concepts presented throughout this disclosure may be implemented across a broad variety of telecommunication systems, network architectures, and communication standards. By way of example and without limitation, the aspects of the present disclosure illustrated in FIG. 1 are presented with reference to a UMTS system employing a TD-SCDMA standard. In this example, the UMTS system includes a radio access network (RAN) 102 (e.g., UTRAN) that provides various wireless services including telephony, video, data, messaging, broadcasts, and/or other services. The RAN 102 may be divided into a number of Radio Network Subsystems (RNSs) such as an RNS 107, each controlled by a Radio Network Controller (RNC) such as an RNC 106. For clarity, only the RNC 106 and the RNS 107 are shown; however, the RAN 102 may include any number of RNCs and RNSs in addition to the RNC 106 and RNS 107. The RNC 106 is an apparatus responsible for, among other things, assigning, reconfiguring and releasing radio resources within the RNS 107. The RNC 106 may be interconnected to other RNCs (not shown) in the RAN 102 through various types of interfaces such as a direct physical connection, a virtual network, or the like, using any suitable transport network.

The geographic region covered by the RNS 107 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, two Node Bs 108 are shown; however, the RNS 107 may include any number of wireless Node Bs. The Node Bs 108 provide wireless access points to a core network 104 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as user equipment (UE) in UMTS applications, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. For illustrative purposes, three UEs 110 are shown in communication with the Node Bs 108. The downlink (DL), also called the forward link, refers to the communication link from a Node B to a UE, and the uplink (UL), also called the reverse link, refers to the communication link from a UE to a Node B.

The core network 104, as shown, includes a GSM core network. However, as those skilled in the art will recognize, the various concepts presented throughout this disclosure may be implemented in a RAN, or other suitable access network, to provide UEs with access to types of core networks other than GSM networks.

In this example, the core network 104 supports circuit-switched services with a mobile switching center (MSC) 112 and a gateway MSC (GMSC) 114. One or more RNCs, such as the RNC 106, may be connected to the MSC 112. The MSC 112 is an apparatus that controls call setup, call routing, and UE mobility functions. The MSC 112 also includes a visitor location register (VLR) (not shown) that contains subscriber-related information for the duration that a UE is in the coverage area of the MSC 112. The GMSC 114 provides a gateway through the MSC 112 for the UE to access a circuit-switched network 116. The GMSC 114 includes a home location register (HLR) (not shown) containing subscriber data, such as the data reflecting the details of the services to which a particular user has subscribed. The HLR is also associated with an authentication center (AuC) that contains subscriber-specific authentication data. When a call is received for a particular UE, the GMSC 114 queries the HLR to determine a location of the UE and forwards the call to the particular MSC serving that location.

The core network 104 also supports packet-data services with a serving GPRS support node (SGSN) 118 and a gateway GPRS support node (GGSN) 120. GPRS, which stands for General Packet Radio Service, is designed to provide packet-data services at speeds higher than those available with standard GSM circuit-switched data services. The GGSN 120 provides a connection for the RAN 102 to a packet-based network 122. The packet-based network 122 may be the Internet, a private data network, or some other suitable packet-based network. The primary function of the GGSN 120 is to provide the UEs 110 with packet-based network connectivity. Data packets are transferred between the GGSN 120 and the UEs 110 through the SGSN 118, which performs primarily the same functions in the packet-based domain as the MSC 112 performs in the circuit-switched domain.

The UMTS air interface is a spread spectrum Direct-Sequence Code Division Multiple Access (DS-CDMA) system. The spread spectrum DS-CDMA spreads user data over a much wider bandwidth through multiplication by a sequence of pseudorandom bits called chips. The TD-SCDMA standard is based on such direct sequence spread spectrum technology and additionally calls for a time division duplexing (TDD), rather than a frequency division duplexing (FDD) as used in many FDD mode UMTS/W-CDMA systems. TDD uses the same carrier frequency for both the uplink (UL) and downlink (DL) between a Node B 108 and a UE 110, but divides uplink and downlink transmissions into different time slots in the carrier.

Figure 2:
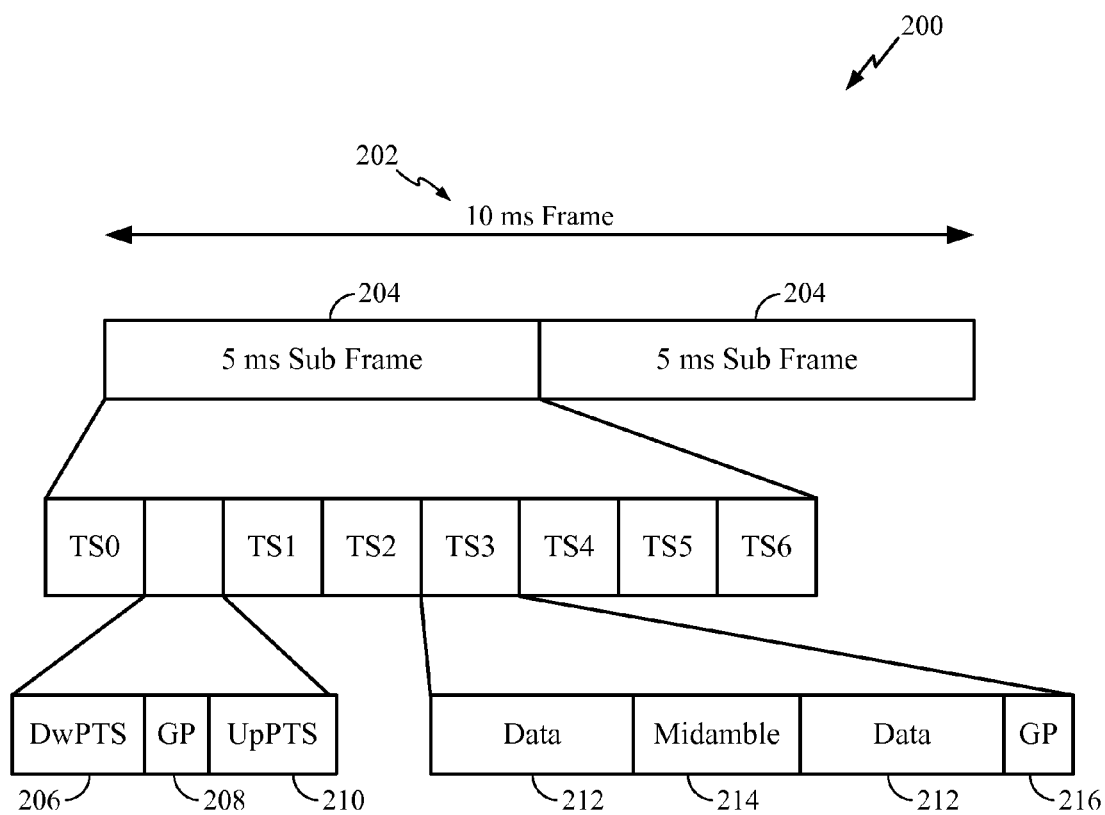
FIG. 2 is a block diagram conceptually illustrating an example of a Time Division Synchronous Code Division Multiple Access (TD-SCDMA) frame structure in accordance with certain aspects of the present disclosure.

FIG. 2 shows a frame structure 200 for a TD-SCDMA carrier. The TD-SCDMA carrier, as illustrated, has a frame 202 that is 10 ms in length. The frame 202 has two 5 ms subframes 204, and each of the subframes 204 includes seven time slots, TS0 through TS6. The first time slot, TS0, is usually allocated for downlink communication, while the second time slot, TS1, is usually allocated for uplink communication. The remaining time slots, TS2 through TS6, may be used for either uplink or downlink, which allows for greater flexibility during times of higher data transmission times in either the uplink or downlink directions. A downlink pilot time slot (DwPTS) 206, a guard period (GP) 208, and an uplink pilot time slot (UpPTS) 210 (also known as the uplink pilot channel (UpPCH)) are located between TS0 and TS1. Each time slot, TS0-TS6, may allow data transmission multiplexed on a maximum of 16 code channels. Data transmission on a code channel includes two data portions 212 separated by a midamble 214 and followed by a guard period (GP) 216. The midamble 214 may be used for features, such as channel estimation, while the GP 216 may be used to avoid inter-burst interference.

Figure 3:
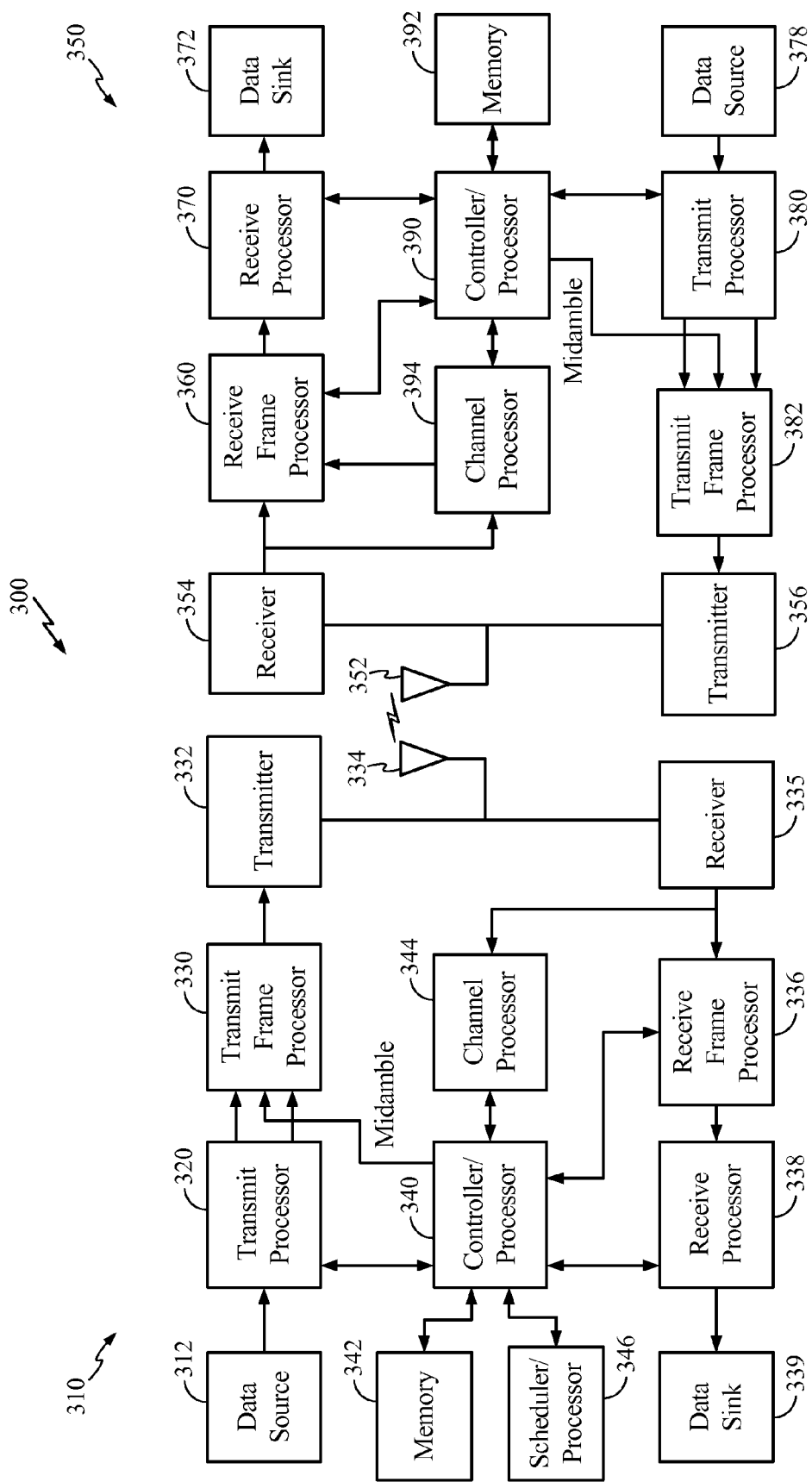
FIG. 3 is a block diagram conceptually illustrating an example of a Node B in communication with a user equipment device (UE) in a telecommunications system in accordance with certain aspects of the present disclosure.

FIG. 3 is a block diagram of a Node B 310 in communication with a UE 350 in a RAN 300, where the RAN 300 may be the RAN 102 in FIG. 1, the Node B 310 may be the Node B 108 in FIG. 1, and the UE 350 may be the UE 110 in FIG. 1. In the downlink communication, a transmit processor 320 may receive data from a data source 312 and control signals from a controller/processor 340. The transmit processor 320 provides various signal processing functions for the data and control signals, as well as reference signals (e.g., pilot signals). For example, the transmit processor 320 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 344 may be used by a controller/processor 340 to determine the coding, modulation, spreading, and/or scrambling schemes for the transmit processor 320. These channel estimates may be derived from a reference signal transmitted by the UE 350 or from feedback contained in the midamble 214 (FIG. 2) from the UE 350. The symbols generated by the transmit processor 320 are provided to a transmit frame processor 330 to create a frame structure. The transmit frame processor 330 creates this frame structure by multiplexing the symbols with a midamble 214 (FIG. 2) from the controller/processor 340, resulting in a series of frames. The frames are then provided to a transmitter 332, which provides various signal conditioning functions including amplifying, filtering, and modulating the frames onto a carrier for downlink transmission over the wireless medium through smart antennas 334. The smart antennas 334 may be implemented with beam steering bidirectional adaptive antenna arrays or other similar beam technologies.

At the UE 350, a receiver 354 receives the downlink transmission through an antenna 352 and processes the transmission to recover the information modulated onto the carrier. The information recovered by the receiver 354 is provided to a receive frame processor 360, which parses each frame, and provides the midamble 214 (FIG. 2) to a channel processor 394 and the data, control, and reference signals to a receive processor 370. The receive processor 370 then performs the inverse of the processing performed by the transmit processor 320 in the Node B 310. More specifically, the receive processor 370 descrambles and despreads the symbols, and then determines the most likely signal constellation points transmitted by the Node B 310 based on the modulation scheme. These soft decisions may be based on channel estimates computed by the channel processor 394. The soft decisions are then decoded and deinterleaved to recover the data, control, and reference signals. The CRC codes are then checked to determine whether the frames were successfully decoded. The data carried by the successfully decoded frames will then be provided to a data sink 372, which represents applications running in the UE 350 and/or various user interfaces (e.g., display). Control signals carried by successfully decoded frames will be provided to a controller/processor 390. When frames are unsuccessfully decoded by the receive processor 370, the controller/processor 390 may also use an acknowledgement (ACK) and/or negative acknowledgement (NACK) protocol to support retransmission requests for those frames.

In the uplink, data from a data source 378 and control signals from the controller/processor 390 are provided to a transmit processor 380. The data source 378 may represent applications running in the UE 350 and various user interfaces (e.g., keyboard). Similar to the functionality described in connection with the downlink transmission by the Node B 310, the transmit processor 380 provides various signal processing functions including CRC codes, coding and interleaving to facilitate FEC, mapping to signal constellations, spreading with OVSFs, and scrambling to produce a series of symbols. Channel estimates, derived by the channel processor 394 from a reference signal transmitted by the Node B 310 or from feedback contained in the midamble transmitted by the Node B 310, may be used to select the appropriate coding, modulation, spreading, and/or scrambling schemes. The symbols produced by the transmit processor 380 will be provided to a transmit frame processor 382 to create a frame structure. The transmit frame processor 382 creates this frame structure by multiplexing the symbols with a midamble 214 (FIG. 2) from the controller/processor 390, resulting in a series of frames. The frames are then provided to a transmitter 356, which provides various signal conditioning functions including amplification, filtering, and modulating the frames onto a carrier for uplink transmission over the wireless medium through the antenna 352.

The uplink transmission is processed at the Node B 310 in a manner similar to that described in connection with the receiver function at the UE 350. A receiver 335 receives the uplink transmission through the antenna 334 and processes the transmission to recover the information modulated onto the carrier. The information recovered by the receiver 335 is provided to a receive frame processor 336, which parses each frame, and provides the midamble 214 (FIG. 2) to the channel processor 344 and the data, control, and reference signals to a receive processor 338. The receive processor 338 performs the inverse of the processing performed by the transmit processor 380 in the UE 350. The data and control signals carried by the successfully decoded frames may then be provided to a data sink 339 and the controller/processor, respectively. If some of the frames were unsuccessfully decoded by the receive processor, the controller/processor 340 may also use an acknowledgement (ACK) and/or negative acknowledgement (NACK) protocol to support retransmission requests for those frames.

The controller/processors 340 and 390 may be used to direct the operation at the Node B 310 and the UE 350, respectively. For example, the controller/processors 340 and 390 may provide various functions including timing, peripheral interfaces, voltage regulation, power management, and other control functions. The computer-readable media of memories 342 and 392 may store data and software for the Node B 310 and the UE 350, respectively. A scheduler/processor 346 at the Node B 310 may be used to allocate resources to the UEs and schedule downlink and/or uplink transmissions for the UEs.

Example Overlying Radio Access Networks

To expand the services available to subscribers, some UEs support communications with multiple radio access technologies (RATs). In deployment of the TD-SCDMA service, a TD-SCDMA radio access network (RAN) may be overlaid with one or more networks using other technologies, such as TDD-LTE (Time Division Duplex Long Term Evolution, also known as LTE-TDD or TD-LTE), CDMA 1xRTT (Radio Transmission Technology), Evolution-Data Optimized (EVDO), Wideband CDMA (WCDMA), Global System for Mobile Communications (GSM), or UMTS Terrestrial Radio Access (UTRA). A multimode terminal (MMT)—supporting, e.g., TD-SCDMA and GSM—may register with both networks to provide services.

Figure 4:
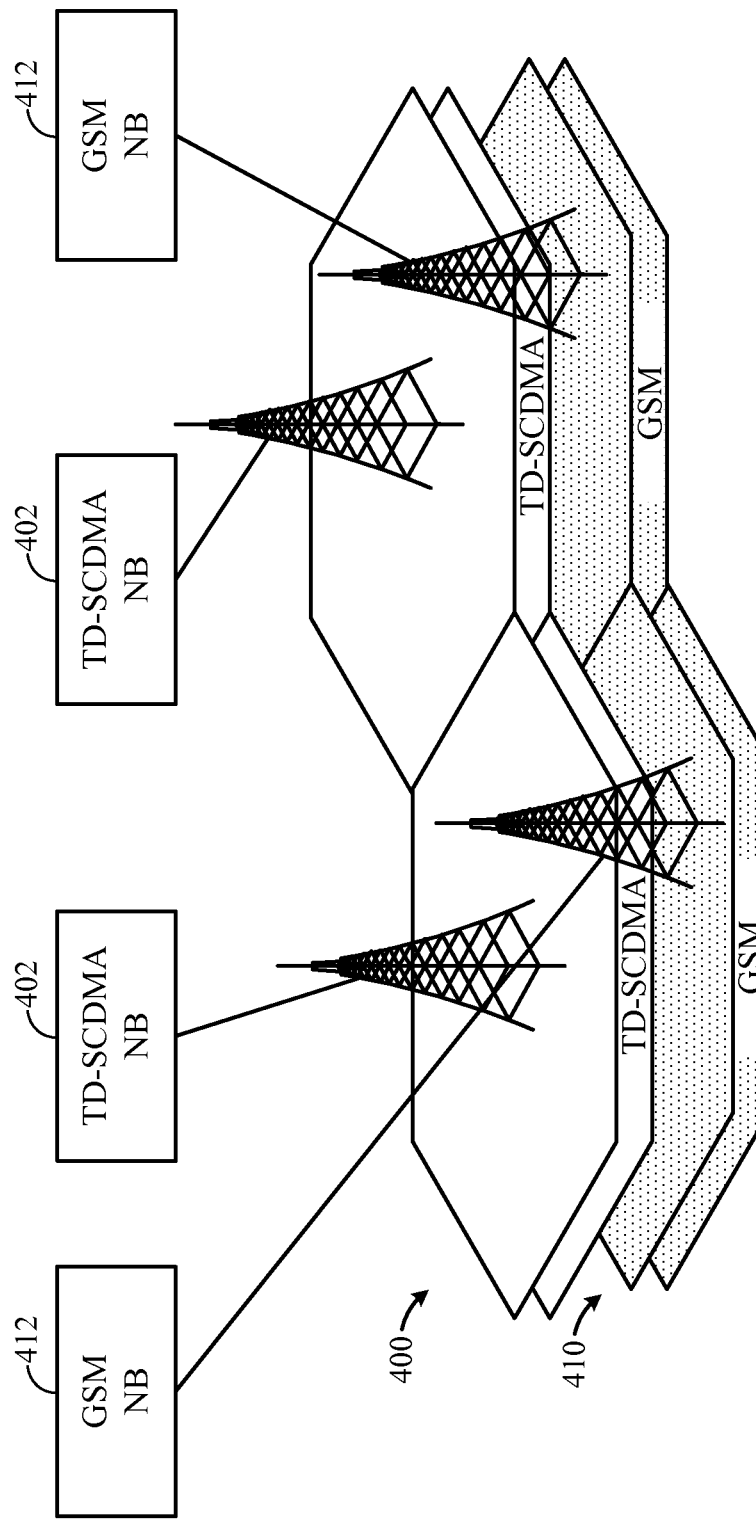
FIG. 4 illustrates an example TD-SCDMA network overlaid on an example Global System for Mobile Communications (GSM) network in accordance with certain aspects of the present disclosure.

FIG. 4 illustrates an example TD-SCDMA network 400 overlaid on an example GSM network 410. An MMT (not shown) may communicate with either or both networks 400, 410 via TD-SCDMA node Bs (NBs) 402 and/or GSM NBs 412. For example, one use case may involve the MMT registering with the GSM network 410 for data service and with the TD-SCDMA network 400 for voice call service. Another use case may occur when the MMT has two subscriber identity modules (SIMs): one for GSM and another for TD-SCDMA.

Example Measurement Scheduling in TD-SCDMA Cell_FACH and Cell_DCH States

While operating in a TD-SCDMA network 400, both scheduled and unscheduled measurement quantities may be measured by the UE. While scheduled measurement quantities may only be taken when Layer 1 (L1) software sends a request to the firmware, unscheduled measurement quantities may be measured continuously—whenever the UE is on the working frequency—by the firmware and made available to the software at each subframe boundary. Scheduled measurement quantities may include an intra-frequency or inter-frequency received signal code power (RSCP), a timeslot interference signal code power (ISCP), a UTRA received signal strength indicator (RSSI), a GSM RSSI, or GSM base station identity code (BSIC) reconfirmation, identification (ID), or tone detection (TD), such as frequency channel (FCH) TD.

An intra-frequency RSCP measurement is made on the timeslot 0 (TS0) midamble 214 of the UE's working frequency and is based on the received power of primary common control physical channel (P-CCPCH) signals received from cells operating on the working frequency. An inter-frequency RSCP measurement is made on the TS0 midamble 214 on a frequency other than the UE's working frequency. Intra-frequency and inter-frequency RSCP measurements may serve the purposes of cell reselection (according to a forward access channel (FACH)), triggering events for reporting to the network, and forming a set for interference cancellation. For N-carrier TD-SCDMA deployment, intra-frequency and inter-frequency measurements may be equally important. The latest TD-SCDMA standard from the Chinese Communications Standards Association (CCSA) requires a UE to support eight additional TD-SCDMA frequencies in the monitored set. The returned results from measuring the primary frequency RSCP is also used for timing and frequency tracking Thus, the measurement of the primary frequency RSCP may most likely be given highest priority.

The timeslot ISCP is an intra-frequency measurement that may be configured on up to five DL timeslots for the serving or neighboring cells. UTRA RSSI is measured on the DwPTS 206 and may be an intra-frequency or inter-frequency measurement. GSM RSSI measurement and BSIC reconfirmation, ID, and TD may be performed in a gap consisting of idle slots that are not scheduled for transmission, reception, or other types of measurements.

However, scheduling all these different types of measurement quantities involves overcoming a number of scheduling challenges. Unlike a frequency division duplex (FDD) system where the cell measurement may be performed at any time during a frame interval, TD-SCDMA cell measurement may only be performed on the midamble of TS0, the availability for measurement of which is affected by many factors. Furthermore, in the Cell_FACH state where signaling and data transmission are possible on common channels, the FACH may be configured with a certain duty cycle such that the FACH measurement occasion (FMO) may not be configured by the network for inter-frequency measurements.

Accordingly, what is needed are techniques and apparatus supporting a unified measurement scheduling algorithm. Ideally, this algorithm would function in both FACH and dedicated channel (DCH) states regardless of the physical channel and FMO configurations.

Figure 5:
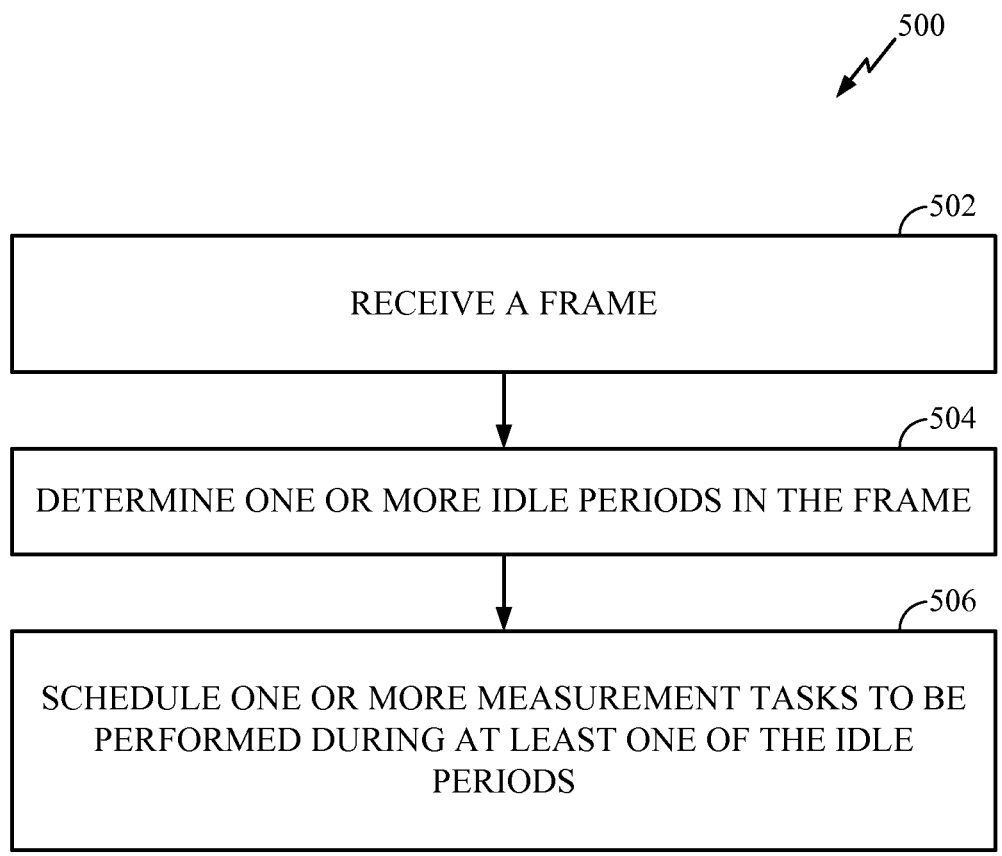
FIG. 5 is a flow diagram illustrating example operations for scheduling measurement tasks based on a priority of the tasks, in accordance with certain aspects of the present disclosure.

FIG. 5 is a flow diagram illustrating example operations 500 for scheduling measurement tasks based on a priority of the tasks. The operations 500 may be executed, for example, by the processor(s) 370 and/or 390 and the receiver 354 of the UE 350 from FIG. 3. The operations 500 may begin, at 502, by receiving a frame. The frame may be received from a serving cell in a first RAN (e.g., a TD-SCDMA network 400).

At 504, the UE may determine one or more idle periods in the frame. For certain aspects, determining the idle periods may comprise determining a status of each slot in the frame, where a slot status may be one of idle, busy (with the primary frequency), busy with the working frequency, or unknown. The idle periods are slots determined as having an idle status.

At 506, the UE may schedule one or more measurement tasks to be performed during at least one of the idle periods. The scheduling is based on a priority of the measurement tasks. The measurement tasks are for measuring at least one parameter of the serving cell on a primary frequency, at least one cell in the first RAN on at least one frequency other than the primary frequency, one or more cells in at least one RAN other than the first RAN, or any combination thereof. For certain aspects, the at least one parameter may comprise a power of a signal received from the serving cell, the at least one cell in the first RAN, or the one or more cells in the at least one RAN other than the first RAN. For certain aspects, the at least one RAN other than the first RAN may comprise a GSM network or a Universal Mobile Telecommunications System (UMTS) Terrestrial Radio Access Network (UTRAN). For certain aspects, the UE may update the status of the slot (e.g., to busy) after scheduling the one or more measurement tasks in the slot. In this manner, the UE may not try to schedule additional measurement tasks in a slot already scheduled for a measurement task (e.g., a busy slot).

For certain aspects, the operations may include determining whether the idle periods are valid for at least one of the measurement tasks before scheduling at least one of the measurement tasks. Determining the validity of the idle periods or other measurement units is described in detail below.

The operations of FIG. 5 may also include taking measurements according to the scheduled measurement tasks to determine parameters (e.g., power of received signals) associated with the serving cell, cells in the first RAN other than the serving cell, which may operate on a frequency other than the primary frequency, and/or cells in RANs other than the first RAN. For certain aspects, the UE may transmit a request to handover to a different cell in the first RAN or in another RAN based on the parameter.

More specifically, the scheduling algorithm may comprise the following steps: (1) form an ordered list of measurement tasks and assign a minimum and a maximum sampling period for items in each task; (2) determine the validity of the upcoming measurement unit; (3) schedule the measurement tasks for the measurement unit; and (4) process the measurement results. The scheduling of GSM BSIC reconfirmation/ID/TD may occur external to the above scheduling algorithm as described in detail below.

Figure 5A:
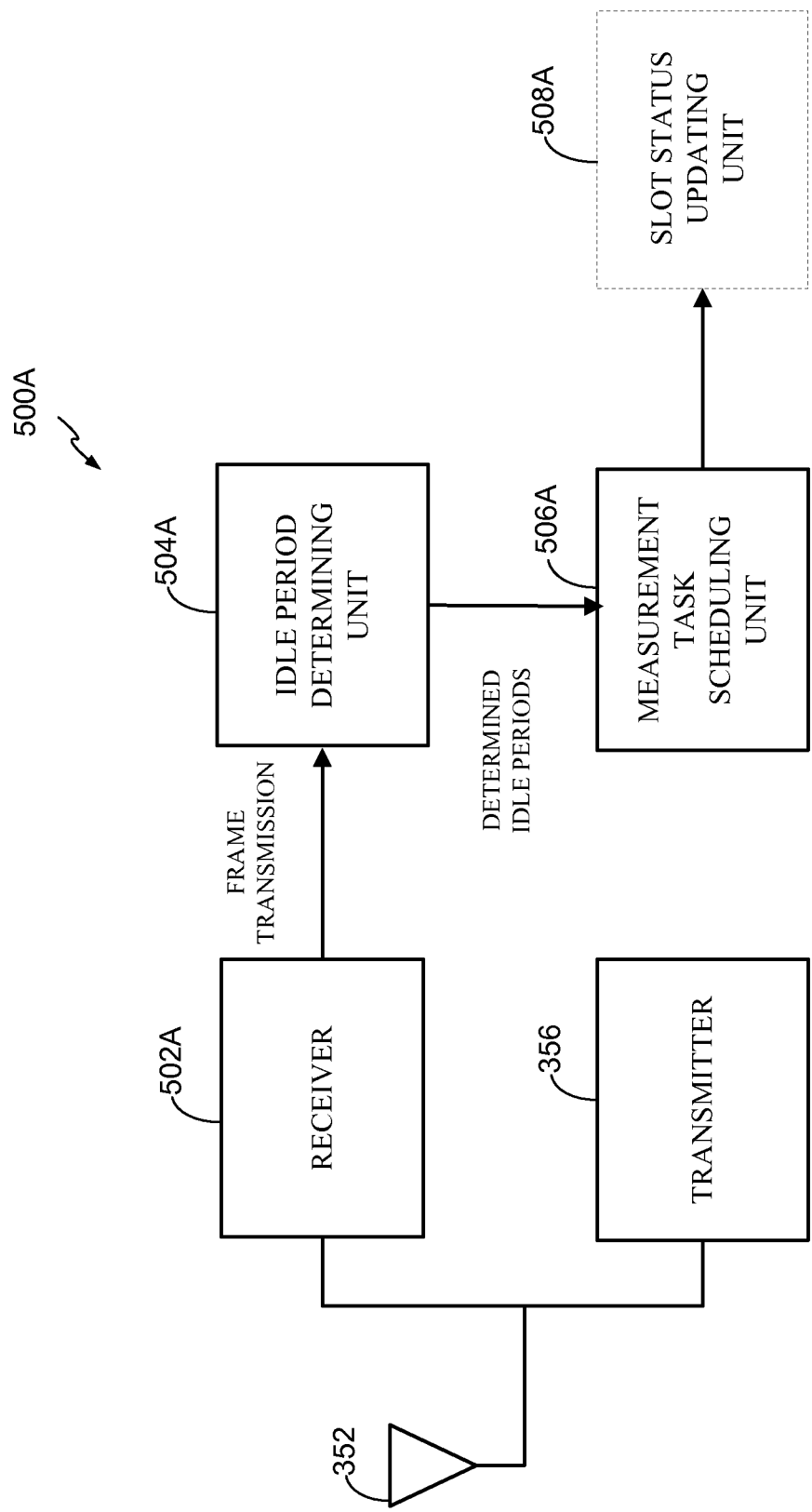
FIG. 5A illustrates example components capable of performing the operations illustrated in FIG. 5.

The operations described above may be performed by any suitable components or other means capable of performing the corresponding functions of FIG. 5. For example, operations 500 illustrated in FIG. 5 correspond to components 500A illustrated in FIG. 5A. In FIG. 5A, a receiver 502A (such as the receiver 354 of FIG. 3) may receive a frame (e.g., from a serving cell in a first RAN). An idle period determining unit 504A may determine one or more idle periods in the frame, perhaps after processing by the receive frame processor 360. A measurement task scheduling unit 506A may schedule one or more measurement tasks to be performed during at least one of the idle periods. The scheduling is based on a priority of the measurement tasks. For certain aspects, a slot status updating unit 508A may optionally update the status of the slot (e.g., to busy) after the one or more measurement tasks are scheduled in the slot. The idle period determining unit 504A, the measurement task scheduling unit 506A, and/or the slot status updating unit 508A may be part of a larger processor, such as the receive processor 370 or the controller/processor 390.

Forming an Ordered List of Measurement Tasks and Assigning Sampling Periods

Figure 6:
FIG. 6 is a table of measurement task priority and associated sampling periods used for scheduling the measurement tasks, in accordance with certain aspects of the present disclosure.

The UE may form a list of measurement tasks 604 according to the following priority order 602, also shown in the table 600 of FIG. 6:

1) RSCP/RSSI measurement on the primary frequency (PF) of the serving cell
2) RSCP/RSSI measurement on a candidate frequency set (CFS), where the CFS is the list of frequencies that have at least one cell belonging to a set of candidate cells, excluding the PF
3) RSCP/RSSI measurement on any remaining frequencies in the monitored set, excluding the PF and CFS members
4) GSM RSSI measurement
5) Timeslot ISCP measurement In the table 600, measurement tasks with a priority order of 1 have a higher priority than tasks with a priority order of 2, for example, and measurement tasks with a priority order of 5 have a lower priority than tasks with a priority order of 4. The RSCP/RSSI measurements may include intra-frequency RSCP measurements, inter-frequency RSCP measurements, and UTRA RSSI measurements. GSM BSIC reconfirmation/ID/TD may be scheduled outside the ordered list of measurement tasks.

Each of the priority order entries in the table 600 may be assigned a minimum sampling period 606 and a maximum sampling period 608. The sampling periods 606, 608 may be specified in milliseconds (ms) for certain aspects. For example, the minimum sampling period 606 for the primary frequency RSCP/RSSI task (Tmin_sp_priF) may be 10 ms, while the maximum sampling period 608 for the primary frequency RSCP/RSSI task (Tmax_sp_priF) may be 40 ms. In the table 600, Nnum_cfs for the CFS RSCP/RSSI task is the number of frequencies present in the set of candidate cells. Ngsm_carrier for the GSM RSSI task is the number of GSM carriers in the monitored set, and Nmin sample rssi is the minimum number of RSSI samples that the UE is able to take in one measurement subframe.

A task may be included in the task list only if the measurement type is enabled by the network. A "measurement item" (i.e., the thing to be measured) in a task is "due" if the item's maximum sampling period is reached. For tasks with priority order 1-3, the measurement item is defined as the frequency to be measured (not the cells on that frequency). For GSM RSSI measurement tasks, the measurement item is defined as a GSM carrier. For timeslot ISCP tasks, the measurement item is defined as a downlink (DL) timeslot where ISCP measurement is configured.

GSM BSIC reconfirmation and identification (ID) may be given the highest priority, because once the computed location of the scheduling channel (SCH) falls in a gap, the UE may most likely take advantage of this to increase the probability of measurement success. GSM tone detection (TD) may be performed on a "best-effort" basis, scheduled whenever there are valid measurement units (e.g., idle slots) that are not scheduled for other measurements.

Determining the Validity of the Upcoming Measurement Unit

As used herein, a "measurement unit" generally refers to a time interval available for scheduling a measurement task. For inter-frequency and inter-RAT measurement, the measurement unit is typically a gap consisting of idle slots in a frame. For intra-frequency measurements, the measurement unit may comprise idle slots and/or slots busy with the working frequency.

More specifically, an intra-frequency RSCP/RSSI measurement unit comprises the first timeslot (TS0) and the DwPTS 206 (TS0+DwPTS) of a subframe 204. A measurement unit is valid for intra-frequency measurement if none of the following is true in any slot within the measurement unit: (1) a scheduled inter-frequency RSCP/RSSI measurement; or (2) a scheduled inter-RAT measurement.

An inter-frequency RSCP/RSSI measurement unit comprises the first timeslot (TS0), and optionally the DwPTS 206, of a subframe 204. A measurement unit is valid for inter-frequency measurement if none of the following is true in any slot within the measurement unit: (1) an FACH or broadcast channel (BCH) reception; or (2) a scheduled intra-frequency RSCP/RSSI, timeslot ISCP, or inter-RAT measurement.

A timeslot ISCP measurement unit comprises a DL slot in a subframe 504 with the slot location as configured by an upper layer. ISCP may be configured for up to five DL slots in a subframe, but not all the DL slots have to be scheduled at once. A measurement unit is valid for ISCP measurement if none of the following is true in the DL slot within the measurement unit: (1) a scheduled inter-frequency RSCP/RSSI measurement; or (2) a scheduled inter-RAT measurement.

A GSM measurement unit comprises a number of consecutive idle slots, also referred to herein as a gap. A slot is an idle slot if none of the following is true: (1) a scheduled transmission; (2) a scheduled reception; or (3) a scheduled intra-frequency/inter-frequency/ISCP measurement. A GSM measurement unit is valid for RSSI measurement if the gap length is large enough for taking at least one RSSI sample. A GSM measurement unit is valid for BSIC reconfirmation/ID/TD if the gap is large enough for decoding the BSIC of one GSM cell.

Scheduling Measurement Tasks

As used herein, the "scheduling point" generally refers to the time when the software invokes a function to schedule the measurement tasks during the measurement units (e.g., the gaps). This scheduling point may occur once every 5 ms. Also as used herein, the "scheduling interval" generally refers to the time interval during which the scheduling algorithm finds measurement units for performing the measurement tasks.

Figure 7A:
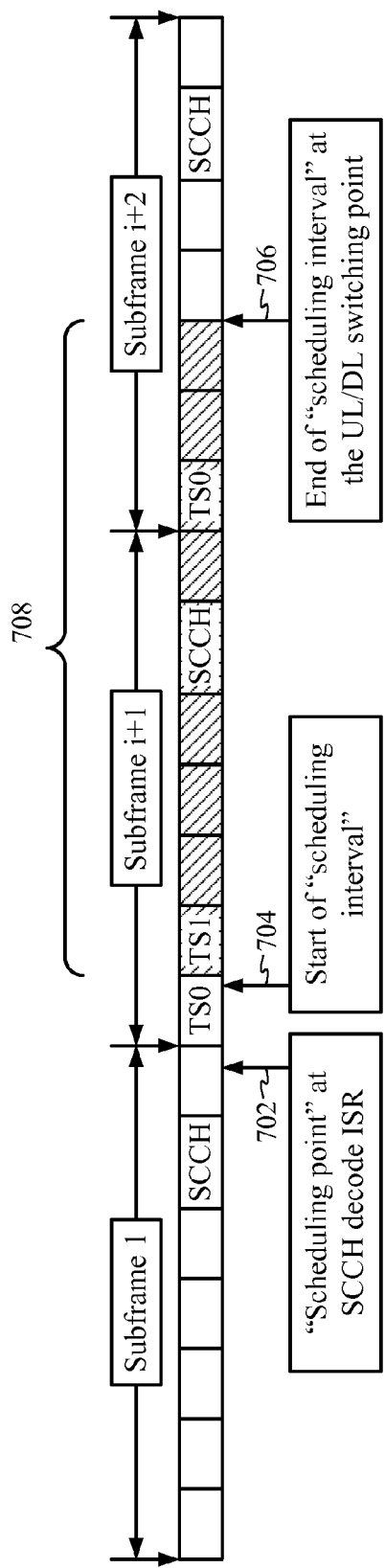
FIG. 7A illustrates the scheduling point and the start and end of the scheduling interval when High-Speed Downlink Packet Access (HSDPA) is active and the High-Speed Shared Control Channel (HS-SCCH) is configured for timeslot 6 (TS6), in accordance with certain aspects of the present disclosure.

FIG. 7A illustrates three consecutive subframes 504 (i, i+1, and i+2), the scheduling point 702, and the start 704 and end 706 of the scheduling interval 708 when High-Speed Downlink Packet Access (HSDPA) is active and the High-Speed Shared Control Channel (HS-SCCH) is configured for timeslot 6 (TS6). In this case, the scheduling point 702 occurs at the decode interrupt of the last HS-SCCH timeslot decoded in subframe i. Here, the start 704 of the scheduling interval 708 occurs at the beginning boundary of TS1 in subframe i+1, and the end 706 of the scheduling interval 708 occurs at the UL/DL switching point in subframe i+2.

Figure 7B:
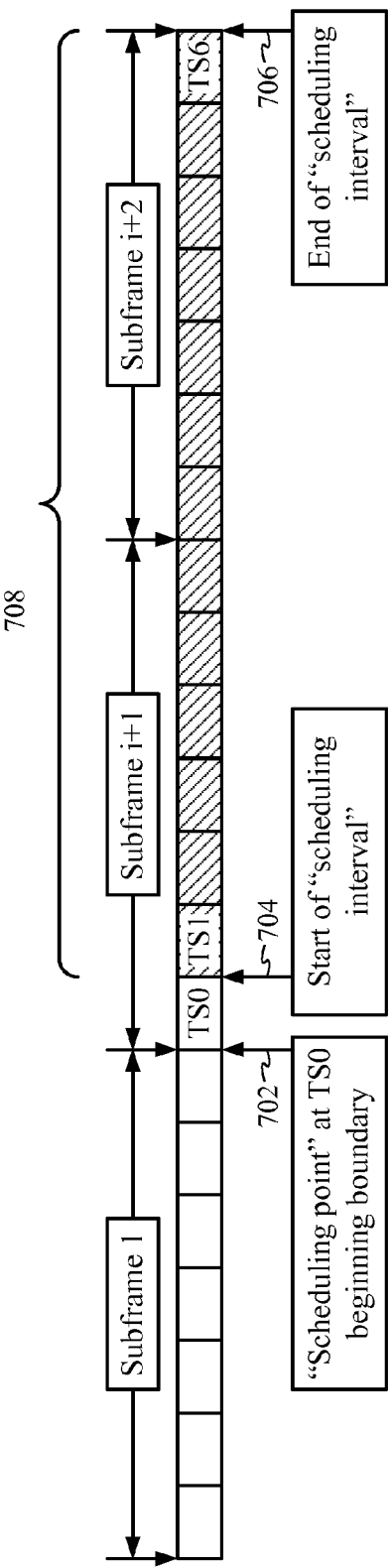
FIG. 7B illustrates the scheduling point and the start and end of the scheduling interval in other cases, in accordance with certain aspects of the present disclosure.

FIG. 7B illustrates the scheduling point 702 and the start 704 and end 706 of the scheduling interval 708 in cases other than when HSDPA is active and the HS-SCCH is configured for TS6. In this case, the software may set up a periodic timer to trigger the scheduling algorithm at the beginning boundary of TS0. In FIG. 7B, the start 704 of the scheduling interval 708 occurs at the beginning boundary of TS1 of subframe i+1, and the end 706 of the scheduling interval 708 occurs at TS6 in subframe i+2.

Figure 8:
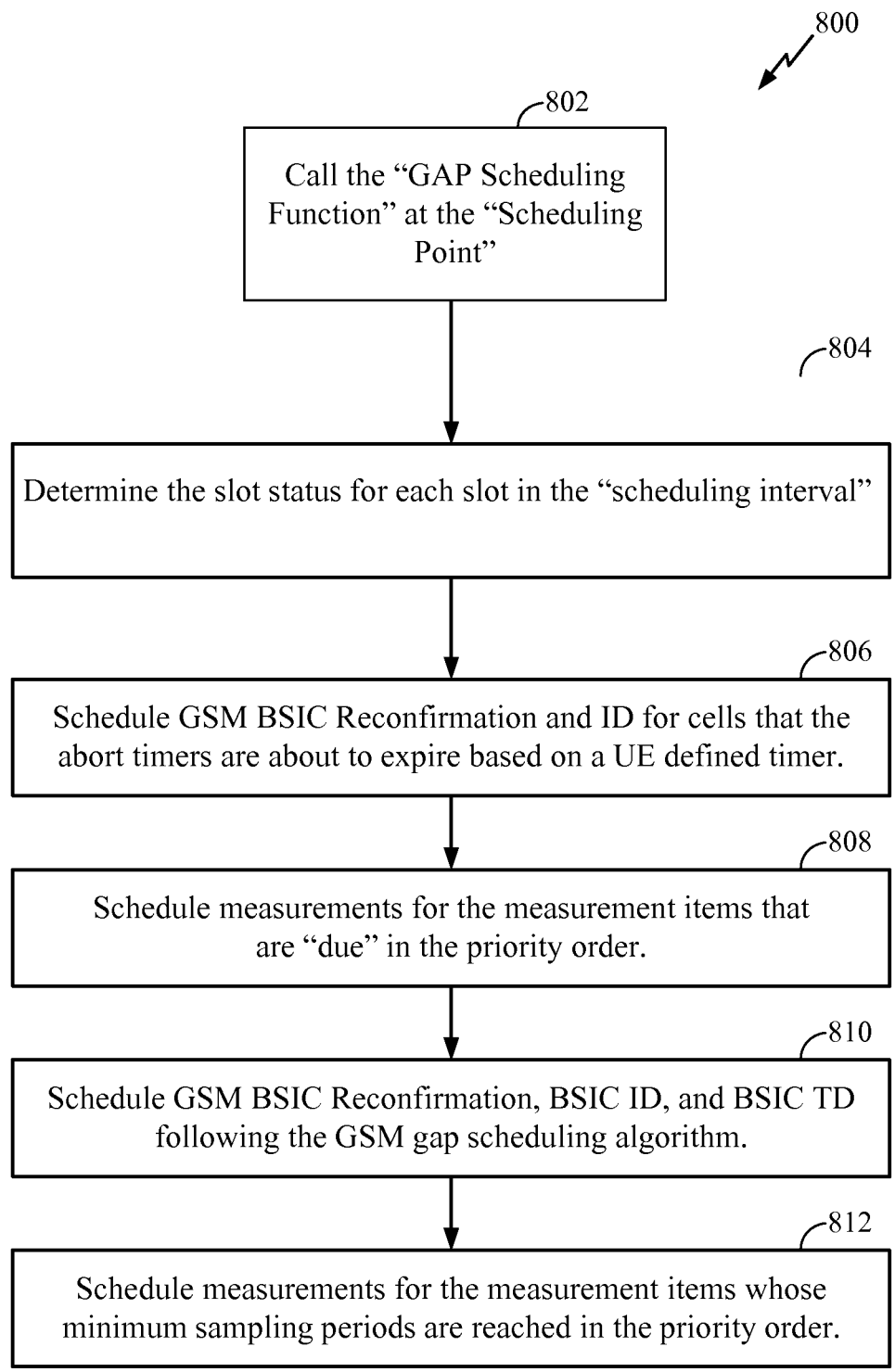
FIG. 8 is a flow diagram illustrating example operations for scheduling measurement tasks based on a priority of the tasks and minimum and maximum sampling periods, in accordance with certain aspects of the present disclosure.

FIG. 8 is a flow diagram illustrating example operations 800 for scheduling the measurement tasks based on a priority of the tasks and minimum and maximum sampling periods in more detail, incorporating many of the concepts described above. The operations 800 may be executed, for example, by the processor(s) 370 and/or 390 and the receiver 354 of the UE 350 from FIG. 3. The operations 800 may begin, at 802, by calling a software function (e.g., a "GAP Scheduling Function") to schedule the measurement tasks. The UE may call the software function at the scheduling point 702 as described above.

At 804, the UE may determine the slot status for each slot in the scheduling interval 708. For example, the slot status may be determined to have a status in the following group: an idle status, a busy status, a busy-with-a-working-frequency status, or an unknown status. Since slots with an idle status have no scheduled transmission, reception, or measurement tasks, idle slots are available for scheduling any measurement task. Busy slots may be busy with the primary frequency. Busy-with-the-working-frequency slots may have a scheduled reception or measurement on the working frequency. Such slots are good for scheduling intra-frequency RSCP or ISCP measurements. The transmission/reception status of unknown slots may be unknown due to High Speed Packet Access (HSPA).

At 806, the UE may schedule GSM BSIC reconfirmation and/or ID for cells in which the abort timers are about to expire, based on a UE-defined timer. To schedule GSM BSIC reconfirmation, a software function (e.g., a "GSM BSIC Reconfirmation Schedule" routine) may be called for GSM measurement units in the scheduling interval 708. Likewise, a separate software routine (e.g., a "GSM BSIC Identification Schedule" function) may be run for GSM measurement units in the scheduling interval 708. The UE may update the slot status for any slot in which such a reconfirmation or ID measurement is successfully scheduled.

At 808, the UE may schedule measurements for the measurement items that are due, in the priority order (e.g., the priority order 602 in the table 600 of FIG. 6). For each task in the measurement task list according to the priority order, a measurement may be scheduled for the measurement item in that task if two conditions are met: (1) the measurement item is due; and (2) there is a valid measurement unit in the scheduling interval 708 for that item. As described above, a measurement item in a task is "due" if the item's maximum sampling period is reached. To resolve a conflict in the case where more than one measurement item is due in a measurement task, the one whose previous measurement occurred first may be selected. If the previous measurements occurred at the same time, a random selection between the measurement items may be made. The UE may then update the slot status for any slot in which a measurement is successfully scheduled.

At 810, the UE may schedule GSM BSIC reconfirmation/ID/TD for available measurement units. For example, the UE may run a "GSM Gap Schedule" algorithm for GSM measurement units in the scheduling interval 708. For certain aspects, if the gap length is long enough for a combined BSIC TD and ID, then both BSIC TD and ID may be scheduled. The UE may update the slot status in the measurement unit if a measurement is successfully scheduled.

At 812, the UE may schedule measurements for the measurement items whose minimum sampling periods are reached, in the priority order (e.g., the priority order 602 in the table 600 of FIG. 6). For each task in the measurement task list according to the priority order, a measurement may be scheduled for the measurement item in that task if two conditions are met: (1) the measurement item's minimum sampling period is reached; and (2) there is a valid measurement unit in the scheduling interval 708 for that item. The UE may then update the slot status for any slot in which a measurement is successfully scheduled.

Figure 9:
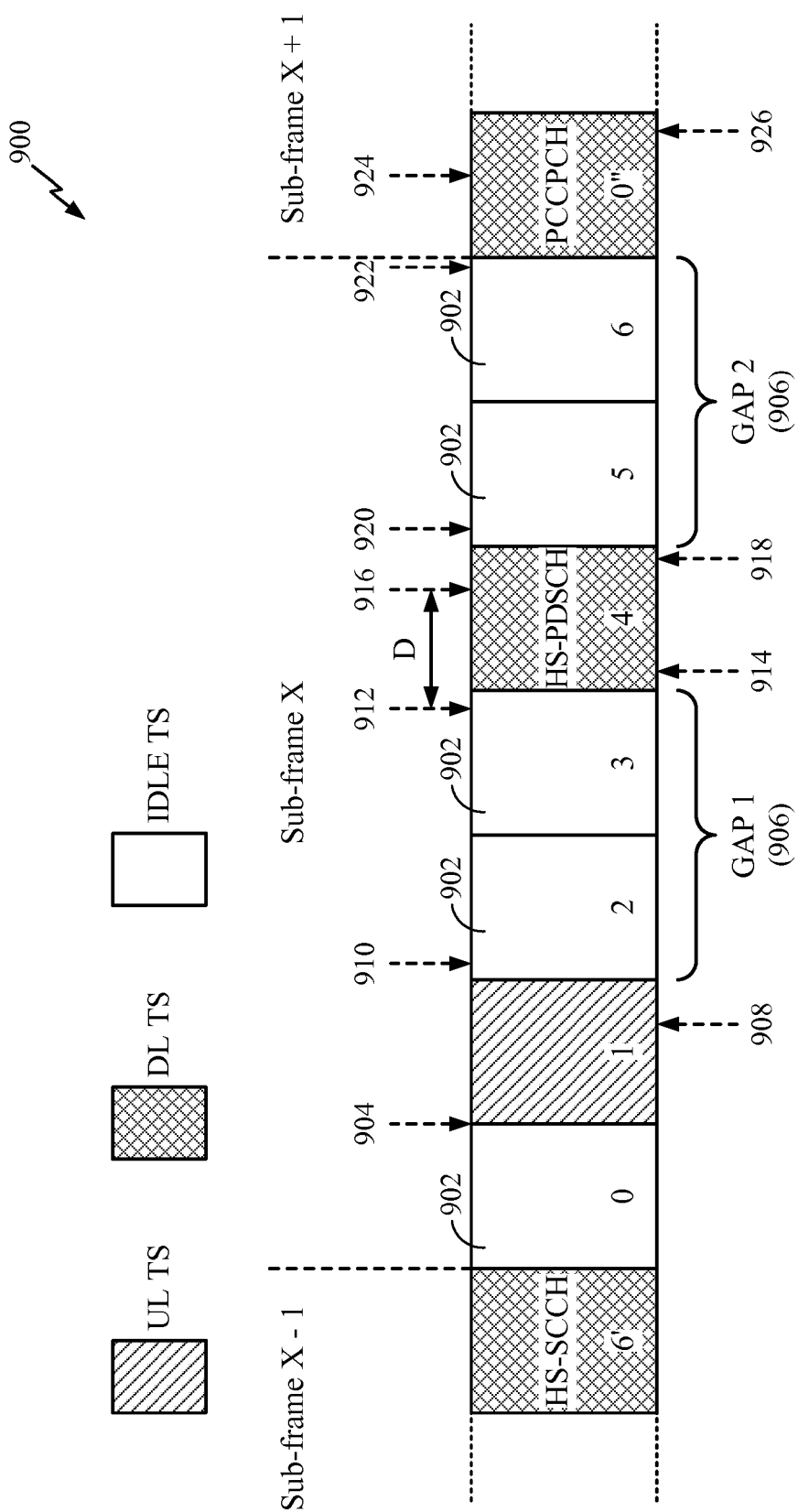
FIG. 9 is a timeline for scheduling GSM measurement tasks, in accordance with certain aspects of the present disclosure.

As an example of scheduling measurement tasks, FIG. 9 illustrates a timeline 900 for scheduling GSM measurement tasks, in accordance with certain aspects of the present disclosure. FIG. 9 illustrates three consecutive TD-SCDMA subframes 504 labeled X−1, X, and X+1, each having seven timeslots (TS0 through TS6). Subframe X has five idle slots 902 (TS0, TS2, TS3, TS5, and TS6). TS1 in subframe X is an uplink (UL) timeslot, while TS4 is a downlink (DL) timeslot.

At 904, the HS-SCCH received in TS6 of subframe X−1 may be decoded. This decoding step may inform the UE which slots will be occupied (e.g., TS4 in subframe X here) and which idle slots may form a gap 906 (i.e., two or more consecutive idle slots). Here, there are two gaps 906 in subframe X labeled Gap 1 (comprising TS2 and TS3) and Gap 2 (comprising TS5 and TS6).

At 908, the UE (or more particularly, software running on the UE) may issue a measurement request for Gap 1. The firmware may begin measurement in Gap 1 at 910. At 912, the firmware may indicate to the software that the firmware is ready to receive the next measurement request. The software may issue, at 914, a measurement request for Gap 2. At 916, the firmware may return a Gap 1 measurement result, and the software may process the Gap 1 measurement result at 918. The firmware may begin measurement in Gap 2 at 920. At 922, the firmware may indicate to the software that the firmware is ready to receive the next measurement request. The firmware may return a Gap 2 measurement result at 924, and the software may process the Gap 2 measurement result at 926.

For certain aspects, if the duration (D) between 912 and 916 is small enough, the firmware need not indicate to the software that the firmware is ready to receive the next measurement. In this case, the software may issue the measurement request for Gap 2 after the firmware returns the Gap 1 measurement result.

In this manner, the UE may dynamically identify slots based on the channel assignments and scheduled data. Once the idle slots are identified, the UE may determine the usage of the idle slots (i.e., determining which measurement tasks should be scheduled) according to the priority scheme described above.

Such dynamic assignment allows the UE to make scheduling decisions on which frequencies and RANs to measure, as well as how often these frequencies and RANs are measured. Therefore, aspects of the present disclosure provide for more efficient use of idle slots over conventional haphazard scheduling. The measurement-scheduling algorithm described above works in both FACH and DCH states, regardless of the physical channel and FMO configuration.

Several aspects of a telecommunications system have been presented with reference to a TD-SCDMA system. As those skilled in the art will readily appreciate, various aspects described throughout this disclosure may be extended to other telecommunication systems, network architectures and communication standards. By way of example, various aspects may be extended to other UMTS systems such as W-CDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Several processors have been described in connection with various apparatuses and methods. These processors may be implemented using electronic hardware, computer software, or any combination thereof. Whether such processors are implemented as hardware or software will depend upon the particular application and overall design constraints imposed on the system. By way of example, a processor, any portion of a processor, or any combination of processors presented in this disclosure may be implemented with a microprocessor, microcontroller, digital signal processor (DSP), a field-programmable gate array (FPGA), a programmable logic device (PLD), a state machine, gated logic, discrete hardware circuits, and other suitable processing components configured to perform the various functions described throughout this disclosure. The functionality of a processor, any portion of a processor, or any combination of processors presented in this disclosure may be implemented with software being executed by a microprocessor, microcontroller, DSP, or other suitable platform.

Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, memory such as a magnetic storage device (e.g., hard disk, floppy disk, magnetic strip), an optical disk (e.g., compact disc (CD), digital versatile disc (DVD)), a smart card, a flash memory device (e.g., card, stick, key drive), random access memory (RAM), read-only memory (ROM), programmable ROM (PROM), erasable PROM (EPROM), electrically erasable PROM (EEPROM), a register, or a removable disk. Although memory is shown separate from the processors in the various aspects presented throughout this disclosure, the memory may be internal to the processors (e.g., cache or register).

Computer-readable media may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

The invention claimed is:

1. A method for wireless communications, comprising:
   receiving a frame by a user equipment (UE);
   determining one or more idle periods in the frame; and
   scheduling one or more measurement tasks to be performed during at least one of the idle periods, wherein the scheduling is based on a priority of the measurement tasks,
   wherein the receiving comprises receiving the frame from a serving cell in a first radio access network (RAN) and wherein the one or more measurement tasks scheduled are selected from a list that includes measuring at least one parameter of the serving cell on a primary frequency, at least one parameter of at least one cell in the first RAN on at least one frequency other than the primary frequency, and at least one parameter of one or more cells in at least one RAN other than the first RAN, and wherein the UE is in a cell forward access channel (CELL_FACH) or a cell dedicated channel (CELL_DCH) state.

2. The method of claim 1, further comprising:

forming an ordered list of the measurement tasks enabled by the first RAN according to the priority of the measurement tasks.

3. The method of claim 2, wherein the measurement tasks for measuring the at least one parameter of the serving cell on the primary frequency have a higher priority than the measurement tasks for measuring the at least one parameter of the at least one cell in the first RAN on the at least one frequency other than the primary frequency.

4. The method of claim 3, wherein the measurement tasks for measuring the at least one parameter of the at least one cell in the first RAN on the at least one frequency other than the primary frequency have a higher priority than the measurement tasks for measuring the at least one parameter of one or more cells in the at least one RAN.

5. The method of claim 4, wherein the at least one parameter comprises a power of a signal received from the serving cell, the at least one cell in the first RAN, or the one or more cells in the at least one RAN other than the first RAN.

6. The method of claim 5, wherein the first RAN comprises a time division-synchronous code division multiple access (TD-SCDMA) network, wherein the signal received from the serving cell comprises a primary common control physical channel (P-CCPCH) signal, wherein the received power of the P-CCPCH signal is used to determine a TD-SCDMA received signal code power (RSCP) for the primary frequency, and wherein the received power of the at least one cell is used to determine at least one TD-SCDMA RSCP for the at least one frequency other than the primary frequency.

7. The method of claim 6, wherein the at least one RAN comprises a global system for mobile communications (GSM) network and wherein the received power of the one or more cells is used to determine one or more GSM received signal strength indicators (RSSIs).

8. The method of claim 7, wherein the measurement tasks comprise measurement tasks for determining a timeslot interference signal code power (ISCP), which have a lower priority than the measurement tasks for determining the one or more GSM RSSIs.

9. The method of claim 7, wherein the measurement tasks comprise measurement tasks for GSM base station identity code (BSIC) identification (ID) and/or reconfirmation, which are scheduled outside the ordered list and have a higher priority than the measurement tasks for measuring the at least one parameter of the serving cell on the primary frequency.

10. The method of claim 7, wherein the measurement tasks comprise measurement tasks for GSM base station identity code (BSIC) tone detection (TD), which are scheduled outside the ordered list and have a lower priority than the measurement tasks for measuring the at least one parameter of the one or more cells in the GSM network.

11. The method of claim 6, wherein the at least one RAN comprises a universal mobile telecommunications system (UMTS) terrestrial radio access network (UTRAN), wherein the measurement tasks comprise measurement tasks for determining a UMTS terrestrial radio access (UTRA) received signal strength indicator (RSSI), and wherein the measurement tasks for determining the UTRA RSSI have the same priority as the measurement tasks for determining the TD-SCDMA RSCP.

12. The method of claim 2, wherein the scheduling is based on the priority and a maximum sampling period for the at least one parameter, such that the measurement tasks corresponding to the at least one parameter that has reached the maximum sampling period are scheduled according to the ordered list.

13. The method of claim 12, wherein the scheduling is based on the priority, the maximum sampling period for the at least one parameter, and a minimum sampling period for the at least one parameter, such that the measurement tasks corresponding to the at least one parameter that has reached the minimum sampling period are scheduled according to the ordered list, after the scheduling of the measurement tasks corresponding to the at least one parameter that has reached the maximum sampling period.

14. The method of claim 1, further comprising determining whether the idle periods are valid for at least one of the measurement tasks before the scheduling of the at least one of the measurement tasks.

15. The method of claim 1, wherein determining the one or more idle periods comprises determining a status of each slot in the frame.

16. The method of claim 15, wherein the status for each slot in the frame comprises at least one of an idle status, a busy status, a busy-with-a-working-frequency status, or an unknown status and wherein the idle periods are slots having the idle status.

17. The method of claim 15, further comprising updating the status of the slot after scheduling the one or more measurement tasks in the slot.

18. An apparatus for wireless communications, comprising:

means for receiving a frame at a user equipment (UE);

means for determining one or more idle periods in the frame; and means for scheduling one or more measurement tasks to be performed during at least one of the idle periods, wherein the scheduling is based on a priority of the measurement tasks, wherein the means for receiving comprises means for receiving the frame from a serving cell in a first radio access network (RAN) and wherein the means for scheduling comprises means for selecting the one or more measurement tasks scheduled from a list that includes measuring at least one parameter of the serving cell on a primary frequency, at least one parameter of at least one cell in the first RAN on at least one frequency other than the primary frequency, and at least one parameter of one or more cells in at least one RAN other than the first RAN, and wherein the UE is in a cell forward access channel (CELL_FACH) or a cell dedicated channel (CELL_DCH) state.

19. The apparatus of claim 18, further comprising means for forming an ordered list of the measurement tasks enabled by the first RAN according to the priority of the measurement tasks.

20. The apparatus of claim 19, wherein the measurement tasks for measuring the at least one parameter of the serving cell on the primary frequency have a higher priority than the measurement tasks for measuring the at least one parameter of the at least one cell in the first RAN on the at least one frequency other than the primary frequency.

21. The apparatus of claim 20, wherein the measurement tasks for measuring the at least one parameter of the at least one cell in the first RAN on the at least one frequency other than the primary frequency have a higher priority than the measurement tasks for measuring the at least one parameter of one or more cells in the at least one RAN.

22. The apparatus of claim 21, wherein the at least one parameter comprises a power of a signal received from the serving cell, the at least one cell in the first RAN, or the one or more cells in the at least one RAN other than the first RAN.

23. The apparatus of claim 22, wherein the first RAN comprises a time division-synchronous code division multiple access (TD-SCDMA) network, wherein the signal received from the serving cell comprises a primary common control physical channel (P-CCPCH) signal, wherein the received power of the P-CCPCH signal is used to determine a TD-SCDMA received signal code power (RSCP) for the primary frequency, and wherein the received power of the at least one cell is used to determine at least one TD-SCDMA RSCP for the at least one frequency other than the primary frequency.

24. The apparatus of claim 23, wherein the at least one RAN comprises a global system for mobile communications (GSM) network and wherein the received power of the one or more cells is used to determine one or more GSM received signal strength indicators (RSSIs).

25. The apparatus of claim 24, wherein the measurement tasks comprise measurement tasks for determining a timeslot interference signal code power (ISCP), which have a lower priority than the measurement tasks for determining the one or more GSM RSSIs.

26. The apparatus of claim 24, wherein the measurement tasks comprise measurement tasks for GSM base station identity code (BSIC) identification (ID) and/or reconfirmation, which are scheduled outside the ordered list and have a higher priority than the measurement tasks for measuring the at least one parameter of the serving cell on the primary frequency.

27. The apparatus of claim 24, wherein the measurement tasks comprise measurement tasks for GSM base station identity code (BSIC) tone detection (TD), which are scheduled outside the ordered list and have a lower priority than the measurement tasks for measuring the at least one parameter of the one or more cells in the GSM network.

28. The apparatus of claim 23, wherein the at least one RAN comprises a universal mobile telecommunications system (UMTS) terrestrial radio access network (UTRAN), wherein the measurement tasks comprise measurement tasks for determining a UMTS terrestrial radio access (UTRA) received signal strength indicator (RSSI), and wherein the measurement tasks for determining the UTRA RSSI have the same priority as the measurement tasks for determining the TD-SCDMA RSCP.

29. The apparatus of claim 19, wherein the scheduling is based on the priority and a maximum sampling period for the at least one parameter, such that the measurement tasks corresponding to the at least one parameter that has reached the maximum sampling period are scheduled according to the ordered list.

30. The apparatus of claim 29, wherein the scheduling is based on the priority, the maximum sampling period for the at least one parameter, and a minimum sampling period for the at least one parameter, such that the measurement tasks corresponding to the at least one parameter that has reached the minimum sampling period are scheduled according to the ordered list, after the scheduling of the measurement tasks corresponding to the at least one parameter that has reached the maximum sampling period.

31. The apparatus of claim 18, further comprising means for determining whether the idle periods are valid for at least one of the measurement tasks before the means for scheduling schedules the at least one of the measurement tasks.

32. The apparatus of claim 18, wherein the means for determining the one or more idle periods is configured to determine a status of each slot in the frame.

33. The apparatus of claim 32, wherein the status for each slot in the frame comprises at least one of an idle status, a busy status, a busy-with-a-working-frequency status, or an unknown status and wherein the idle periods are slots having the idle status.

34. The apparatus of claim 32, further comprising means for updating the status of the slot after the means for scheduling schedules the one or more measurement tasks in the slot.

35. An apparatus for wireless communications, comprising:
a receiver configured to receive a frame at a user equipment (UE);
at least one processor configured to:
determine one or more idle periods in the frame; and
schedule one or more measurement tasks to be performed during at least one of the idle periods, wherein the scheduling is based on a priority of the measurement tasks;
wherein the receiver is configured to receive the frame from a serving cell in a first radio access network (RAN) and wherein the one or more measurement tasks scheduled are selected from a list that includes measuring at least one parameter of the serving cell on a primary frequency, at least one parameter of at least one cell in the first RAN on at least one frequency other than the primary frequency, and at least one parameter of one or more cells in at least one RAN other than the first RAN, and
wherein the UE is in a cell forward access channel (CELL_FACH) or a cell dedicated channel (CELL_DHC) state, and a memory coupled to the at least one processor.

36. The apparatus of claim 35, wherein the at least one processor is configured to form an ordered list of the measurement tasks enabled by the first RAN according to the priority of the measurement tasks.

37. The apparatus of claim 36, wherein the measurement tasks for measuring the at least one parameter of the serving cell on the primary frequency have a higher priority than the measurement tasks for measuring the at least one parameter of the at least one cell in the first RAN on the at least one frequency other than the primary frequency.

38. The apparatus of claim 37, wherein the measurement tasks for measuring the at least one parameter of the at least one cell in the first RAN on the at least one frequency other than the primary frequency have a higher priority than the measurement tasks for measuring the at least one parameter of one or more cells in the at least one RAN.

39. The apparatus of claim 38, wherein the at least one parameter comprises a power of a signal received from the serving cell, the at least one cell in the first RAN, or the one or more cells in the at least one RAN other than the first RAN.

40. The apparatus of claim 39, wherein the first RAN comprises a time division-synchronous code division multiple access (TD-SCDMA) network, wherein the signal received from the serving cell comprises a primary common control physical channel (P-CCPCH) signal, wherein the received power of the P-CCPCH signal is used to determine a TD-SCDMA received signal code power (RSCP) for the primary frequency, and wherein the received power of the at least one cell is used to determine at least one TD-SCDMA RSCP for the at least one frequency other than the primary frequency.

41. The apparatus of claim 40, wherein the at least one RAN comprises a global system for mobile communications (GSM) network and wherein the received power of the one or more cells is used to determine one or more GSM received signal strength indicators (RSSIs).

42. The apparatus of claim 41, wherein the measurement tasks comprise measurement tasks for determining a timeslot interference signal code power (ISCP), which have a lower priority than the measurement tasks for determining the one or more GSM RSSIs.

43. The apparatus of claim 41, wherein the measurement tasks comprise measurement tasks for GSM base station identity code (BSIC) identification (ID) and/or reconfirmation, which are scheduled outside the ordered list and have a higher priority than the measurement tasks for measuring the at least one parameter of the serving cell on the primary frequency.

44. The apparatus of claim 41, wherein the measurement tasks comprise measurement tasks for GSM base station identity code (BSIC) tone detection (TD), which are scheduled outside the ordered list and have a lower priority than the measurement tasks for measuring the at least one parameter of the one or more cells in the GSM network.

45. The apparatus of claim 40, wherein the at least one RAN comprises a universal mobile telecommunications system (UMTS) terrestrial radio access network (UTRAN), wherein the measurement tasks comprise measurement tasks for determining a UMTS terrestrial radio access (UTRA) received signal strength indicator (RSSI) and wherein the measurement tasks for determining the UTRA RSSI have the same priority as the measurement tasks for determining the TD-SCDMA RSCP.

46. The apparatus of claim 36, wherein the scheduling is based on the priority and a maximum sampling period for the at least one parameter, such that the at least one processor is configured to schedule the measurement tasks corresponding to the at least one parameter that has reached the maximum sampling period according to the ordered list.

47. The apparatus of claim 46, wherein the scheduling is based on the priority, the maximum sampling period for the at least one parameter, and a minimum sampling period for the at least one parameter, such that the measurement tasks corresponding to the at least one parameter that has reached the minimum sampling period are scheduled according to the ordered list, after the scheduling of the measurement tasks corresponding to the at least one parameter that has reached the maximum sampling period.

48. The apparatus of claim 35, wherein the at least one processor is configured to determine whether the idle periods are valid for at least one of the measurement tasks before the scheduling of the at least one of the measurement tasks.

49. The apparatus of claim 35, wherein the at least one processor is configured to determine the one or more idle periods by determining a status of each slot in the frame.

50. The apparatus of claim 49, wherein the status for each slot in the frame comprises at least one of an idle status, a busy status, a busy-with-a-working-frequency status, or an unknown status and wherein the idle periods are slots having the idle status.

51. The apparatus of claim 49, wherein the at least one processor is configured to update the status of the slot after scheduling the one or more measurement tasks in the slot.

52. A computer-program product for wireless communications, the computer-program product comprising:
a non-transitory computer-readable medium comprising code for:
receiving a frame at a user equipment (UE);
determining one or more idle periods in the frame; and
scheduling one or more measurement tasks to be performed during at least one of the idle periods, wherein the scheduling is based on a priority of the measurement tasks,
wherein the code for receiving comprises code for receiving the frame from a serving cell in a first radio access network (RAN) and wherein the code for scheduling the one or more measurement tasks comprises code for selecting the measurements tasks from a list that includes measuring at least one parameter of the serving cell on a primary frequency, at least one parameter of at least one cell in the first RAN on at least one frequency other than the primary frequency, and at least one parameter of one or more cells in at least one RAN other than the first RAN, and
wherein the UE is in a cell forward access channel (CELL_FACH) or a cell dedicated channel (CELL_DCH) state.

53. The computer-program product of claim 52, further comprising code for forming an ordered list of the measurement tasks enabled by the first RAN according to the priority of the measurement tasks.

54. The computer-program product of claim 53, wherein the measurement tasks for measuring the at least one parameter of the serving cell on the primary frequency have a higher priority than the measurement tasks for measuring the at least one parameter of the at least one cell in the first RAN on the at least one frequency other than the primary frequency.

55. The computer-program product of claim 54, wherein the measurement tasks for measuring the at least one parameter of the at least one cell in the first RAN on the at least one frequency other than the primary frequency have a higher priority than the measurement tasks for measuring the at least one parameter of one or more cells in the at least one RAN.

56. The computer-program product of claim 55, wherein the at least one parameter comprises a power of a signal received from the serving cell, the at least one cell in the first RAN, or the one or more cells in the at least one RAN other than the first RAN.

57. The computer-program product of claim 56, wherein the first RAN comprises a time division-synchronous code division multiple access (TD-SCDMA) network, wherein the signal received from the serving cell comprises a primary common control physical channel (P-CCPCH) signal, wherein the received power of the P-CCPCH signal is used to determine a TD-SCDMA received signal code power (RSCP) for the primary frequency, and wherein the received power of the at least one cell is used to determine at least one TD-SCDMA RSCP for the at least one frequency other than the primary frequency.

58. The computer-program product of claim 57, wherein the at least one RAN comprises a global system for mobile communications (GSM) network and wherein the received power of the one or more cells is used to determine one or more GSM received signal strength indicators (RSSIs).

59. The computer-program product of claim 58, wherein the measurement tasks comprise measurement tasks for determining a timeslot interference signal code power (ISCP), which have a lower priority than the measurement tasks for determining the one or more GSM RSSIs.

60. The computer-program product of claim 58, wherein the measurement tasks comprise measurement tasks for GSM base station identity code (BSIC) identification (ID) and/or reconfirmation, which are scheduled outside the ordered list and have a higher priority than the measurement tasks for measuring the at least one parameter of the serving cell on the primary frequency.

61. The computer-program product of claim 58, wherein the measurement tasks comprise measurement tasks for GSM base station identity code (BSIC) tone detection (TD), which are scheduled outside the ordered list and have a lower priority than the measurement tasks for measuring the at least one parameter of the one or more cells in the GSM network.

62. The computer-program product of claim 57, wherein the at least one RAN comprises a universal mobile telecommunications system (UMTS) terrestrial radio access network (UTRAN), wherein the measurement tasks comprise measurement tasks for determining a UMTS terrestrial radio access (UTRA) received signal strength indicator (RSSI) and wherein the measurement tasks for determining the UTRA RSSI have the same priority as the measurement tasks for determining the TD-SCDMA RSCP.

63. The computer-program product of claim 53, wherein the scheduling is based on the priority and a maximum sampling period for the at least one parameter, such that the measurement tasks corresponding to the at least one parameter that has reached the maximum sampling period are scheduled according to the ordered list.

64. The computer-program product of claim 63, wherein the scheduling is based on the priority, the maximum sampling period for the at least one parameter, and a minimum sampling period for the at least one parameter, such that the measurement tasks corresponding to the at least one parameter that has reached the minimum sampling period are scheduled according to the ordered list, after the scheduling of the measurement tasks corresponding to the at least one parameter that has reached the maximum sampling period.

65. The computer-program product of claim 52, further comprising code for determining whether the idle periods are valid for at least one of the measurement tasks before the scheduling of the at least one of the measurement tasks.

66. The computer-program product of claim 52, wherein determining the one or more idle periods comprises determining a status of each slot in the frame.

67. The computer-program product of claim 66, wherein the status for each slot in the frame comprises at least one of an idle status, a busy status, a busy-with-a-working-frequency status, or an unknown status and wherein the idle periods are slots having the idle status.

68. The computer-program product of claim 66, further comprising code for updating the status of the slot after scheduling the one or more measurement tasks in the slot.

\* \* \* \* \*